United States Patent
Tatsuzawa

(10) Patent No.: US 8,587,701 B2
(45) Date of Patent: Nov. 19, 2013

(54) IMAGE PROCESSING APPARATUS, CAMERA MODULE, AND IMAGE PROCESSING METHOD

(75) Inventor: Yukiyasu Tatsuzawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 372 days.

(21) Appl. No.: 13/049,300

(22) Filed: Mar. 16, 2011

(65) Prior Publication Data

US 2012/0019691 A1    Jan. 26, 2012

(30) Foreign Application Priority Data

Jul. 22, 2010  (JP) ................................ 2010-164929

(51) Int. Cl.
*H04N 5/217* (2011.01)
*H04N 9/64* (2006.01)

(52) U.S. Cl.
USPC ........................................... 348/246; 348/241

(58) Field of Classification Search
USPC ........................................ 348/241, 246, 247
See application file for complete search history.

(56) References Cited

U.S. PATENT DOCUMENTS

| | | | |
|---|---|---|---|
| 5,327,246 A * | 7/1994 | Suzuki .......................... | 348/246 |
| 7,564,491 B2 * | 7/2009 | Yoneda et al. ................. | 348/246 |
| 7,755,680 B2 * | 7/2010 | Watanabe ...................... | 348/247 |
| 7,796,169 B2 * | 9/2010 | Kitani ............................ | 348/247 |
| 8,085,322 B2 | 12/2011 | Seki et al. | |
| 8,154,632 B2 * | 4/2012 | McKinnon et al. ........... | 348/246 |
| 2002/0005904 A1 * | 1/2002 | Mendis .......................... | 348/246 |
| 2010/0007777 A1 * | 1/2010 | Walter et al. .................. | 348/247 |

FOREIGN PATENT DOCUMENTS

| | | |
|---|---|---|
| JP | 2008-113163 | 5/2008 |
| JP | 2008-258909 | 10/2008 |

OTHER PUBLICATIONS

Japanese Office Action issued Jan. 22, 2013, in Japan Patent Application No. 2010-164929 (with English translation).

* cited by examiner

Primary Examiner — Daniel M Pasiewicz

(74) *Attorney, Agent, or Firm* — Oblon, Spivak, McClelland, Maier & Neustadt, L.L.P.

(57) ABSTRACT

According to one embodiment, a selection unit selects a pixel value to be assigned to a target pixel according to a determination result of a defect determining unit. The defect determining unit performs defect determination according to the level of a signal-to-noise ratio (SNR) estimated by an SNR estimating unit. In the case where the defect determining unit determines that the target pixel is a defect, the selection unit outputs a pixel value according to the level of the SNR.

12 Claims, 5 Drawing Sheets

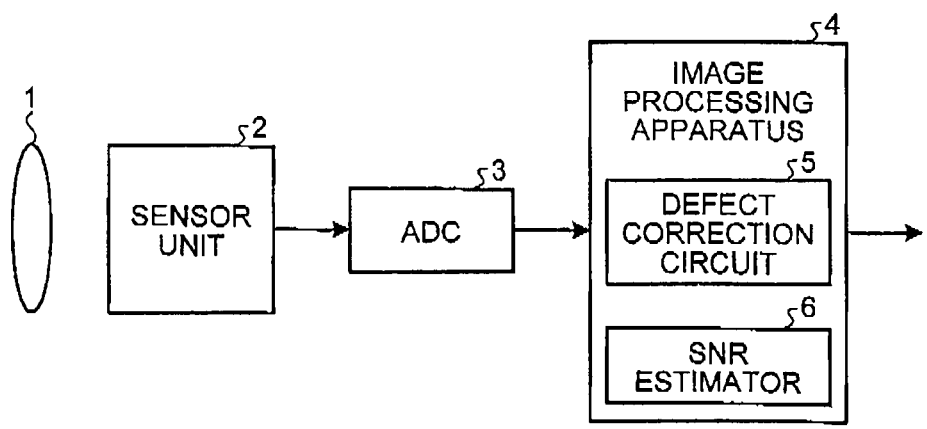

IMAGE PROCESSING APPARATUS, CAMERA MODULE, AND IMAGE PROCESSING METHOD

CROSS-REFERENCE TO RELATED APPLICATIONS

This application is based upon and claims the benefit of priority from the prior Japanese Patent Application No. 2010-164929, filed on Jul. 22, 2010; the entire contents of which are incorporated herein by reference.

FIELD

Embodiments described herein relate generally to an image processing apparatus, a camera module, and an image processing method.

BACKGROUND

Recently, the number of pixels of a camera module, such as a camera mounted in a mobile phone and a digital camera, has been increasing. With an increase in the number of pixels, miniaturization of pixels is required. Under this situation, such a problem is at issue that there is an absent portion (hereinafter, appropriately referred to as "a defect") of a digital image signal generated due to a pixel which does not normally function.

In a defect inspection during the manufacture of a camera module, manufactured goods recognized to have defective pixels more than that of the regulations is handled as defective products. As the regulation becomes stricter, the yield of camera modules decreases and thus the manufacturing cost increases. Accordingly, in the related art, a method of obscuring a defect is actively used in which signal processing is performed by a defect correction circuit.

Defect detecting methods are generally classified into two types, a predetection type and a dynamic detection type. The predetection type is a method which detects a defect caused in the process of defect inspection after manufacturing of a camera module and stores address information of the defect in each sensor. The predetection type method is mainly used for the purpose of compensating for a defect by a defect in a multi-layer structure, a leakage current of a floating junction, or the like. The dynamic detection type is a method which detects a defect from a digital image signal during an operation of a camera module. The dynamic detection type method is mainly used for the purpose of compensating for a photodiode-based defect which randomly occurs depending on a temperature characteristic, an exposure time period, etc.

There are some defect correction circuits capable of coping even with a case where two pixels out of 9 (3×3) pixels for the same color are defects (hereinafter, appropriately referred to as two pixel defects). In the case of applying the prediction type method to the case of two pixel defects, problems arise in that there is the limit of address information that can be stored in a circuit in advance and the size of a circuit increases. Further, in the case where an analog gain is high, two pixel defects which are not detected through the defect inspection may come to be noticeable.

In the case of coping with two pixel defects, there is a possibility that not only a target pixel is a defect but also an adjacent pixel of the target pixel is a defect. This reduces the information of adjacent pixels usable for defect detection. As there is less information on the adjacent pixels usable for defect detection, the likeliness of erroneous correction increases. Further, in general, as the amount of incident light increases and an analog gain decreases, it is difficult for two pixel defects to occur and an edge portion is sharper. In this case, applying of strict defect detection and defect correction aimed at the two pixel defects are accompanied by a risk encouraging erroneous correction at an edge portion. Like this, according to the related art, even in the case of coping with two pixel defects by the dynamic detection type method, occurrence of a false color by erroneous correction, a reduction in the resolution, and so on become problems.

BRIEF DESCRIPTION OF THE DRAWINGS

FIG. 1 is a block diagram illustrating a configuration of a camera module having an image processing apparatus according to an embodiment;

FIG. 2 is a conceptual view illustrating pixels with pixel values referred to during defect correction in a defect correction circuit;

DETAILED DESCRIPTION

Figure 3:
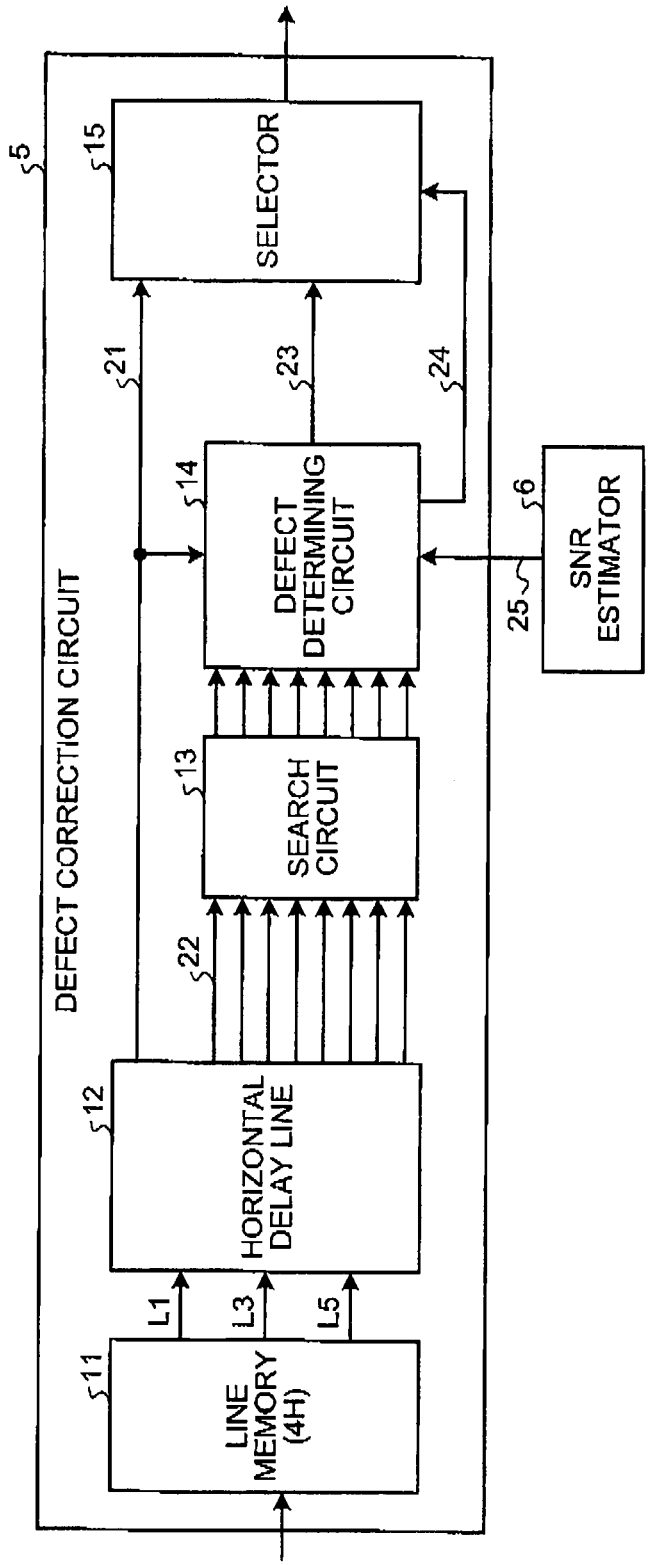
FIG. 3 is a block diagram illustrating a configuration of the defect correction circuit.

According to an embodiment, an image processing apparatus includes a defect determining unit, a selection unit, and a signal-to-noise ratio (hereinafter, referred to as SNR) estimating unit. The defect determining unit determines whether a target pixel is a defect or not, on the basis of the pixel value of the target pixel and the pixel values of a plurality of adjacent pixels. The adjacent pixels are pixels for the same color as that of the target pixel and are located around the target pixel. The selection unit selects a pixel value to be assigned to the target pixel according to a determination result of the defect determining unit. The SNR estimating unit estimates an SNR of an image signal. The defect determining unit performs defect determination according to the level of the SNR estimated by the SNR estimating unit. In the case where the defect determining unit determines that the target pixel is a defect, the selection unit outputs a pixel value according to the level of the SNR.

Exemplary embodiments of an image processing apparatus, a camera module, and an image processing method will be explained below in detail with reference to the accompanying drawings. The present invention is not limited to the following embodiments.

FIG. 1 is a block diagram illustrating a configuration of a camera module having an image processing apparatus according to an embodiment. A camera module includes an imaging lens 1, a sensor unit 2, an analog-to-digital converter (ADC) 3, and an image processing apparatus 4. The imaging lens 1 receives in light from an object, and focuses the light onto the sensor unit 2.

The sensor unit 2 converts the light received by the imaging lens 1 into signal charge, thereby capturing an object image. The sensor unit 2 receives the signal levels of R, G, and B in the order corresponding to a Bayer array, sequentially amplifies the received analog image signals with a gain according to an imaging condition set from the outside, and sequentially outputs the amplified analog image signals. The ADC 3 converts the analog image signals from the sensor unit 2 into digital image signals.

The image processing apparatus 4 performs image processing on the digital image signals from the ADC 3. The image processing apparatus 4 includes a defect correction circuit 5 and an SNR estimator 6.

The defect correction circuit 5 performs defect correction. The SNR estimator 6 functions as an SNR estimation unit for estimating an SNR of an image signal. The SNR estimator 6 estimates an SNR according to, for example, an analog gain of an image signal. In addition, the image processing apparatus 4 performs various kinds of image processing, for example, demosaicing, white balance adjustment, gamma processing, etc.

FIG. 2 is a conceptual view illustrating pixels with pixel values that are used as references during defect correction in the defect correction circuit. The Bayer array is configured to have four pixels of Gr, R, Gb, and B per unit. The Gr pixel is a G pixel parallel to the R pixel on a line. The Gb pixel is a G pixel parallel to the B pixel on a line. The image signals are input as signals of each line (a Gr/R line, a Gb/B line) to the defect correction circuit 5.

The defect correction circuit 5 sets a central pixel p33 out of 25 pixels forming a matrix of 5 lines L1 to L5 in a vertical direction and 5 pixels in a horizontal direction, as a target pixel which is a subject of defect determination and defect correction. The defect correction circuit 5 performs defect determination and defect correction on the basis of the pixel value of the target pixel p33 and the pixel values of 8 adjacent pixels p11, p13, p15, p31, p35, p51, p53, and p55. The adjacent pixels are pixels for the same color as that of the target pixel and are located around the target pixel. The defect correction circuit 5 is a kernel of 3 times 3 pixels for the same color, in the horizontal direction and in the vertical direction and performs signal processing.

FIG. 3 is a block diagram illustrating a configuration of the defect correction circuit. The defect correction circuit 5 includes a line memory 11, a horizontal delay line 12, a search circuit 13, a defect determining circuit 14, and a selector 15. The line memory 11 stores signals of 4 lines 4H and performs horizontal delay (line delay). The line memory 11 outputs the stored signals of 3 lines L1, L3, and L5, including the target pixel and the adjacent pixels, of total 5 lines including 4 lines L1, L2, L3, and L4 and one main line L5, to the horizontal delay line 12.

Figure 4:
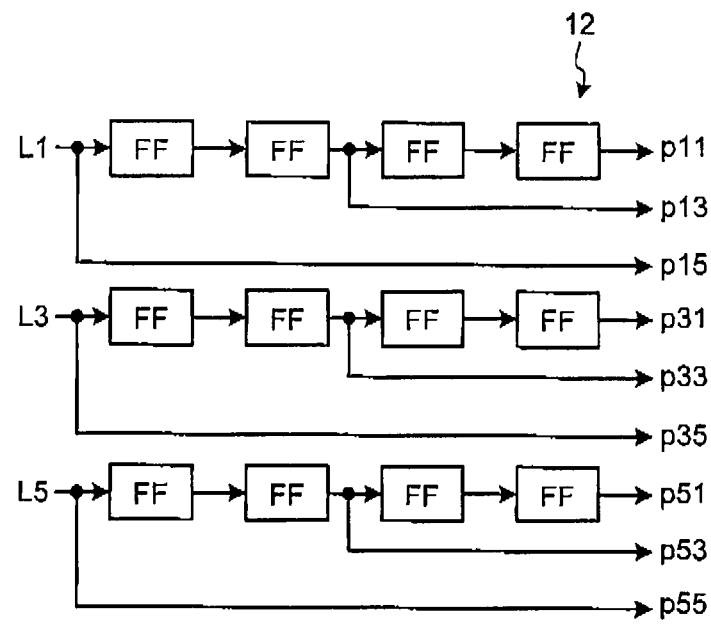
FIG. 4 is a block diagram illustrating a configuration of a horizontal delay line.

FIG. 4 is a block diagram illustrating a configuration of the horizontal delay line. Flip-flops FF store the signal levels of pixels. The horizontal delay line 12 stores signals of 4 pixels for each line and performs horizontal delay. The horizontal delay line 12 synchronizes a signal 21 for the target pixel with signals 22 (see FIG. 3) for the 8 adjacent pixels. The horizontal delay line 12 outputs the signal 21 for the target pixel to the defect determining circuit 14 and the selector 15. The horizontal delay line 12 outputs the signals 22 for the adjacent pixels to the search circuit 13.

Figure 5:
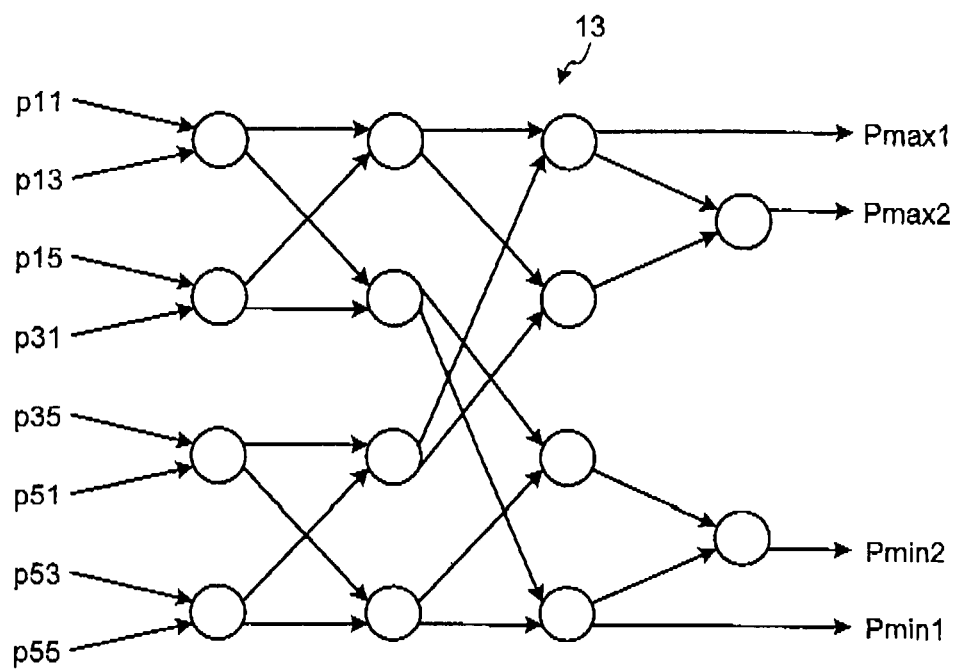
FIG. 5 is a conceptual view illustrating a configuration of the search circuit.

FIG. 5 is a conceptual view illustrating a configuration of the search circuit. Circles illustrated in FIG. 5 represent comparators for comparing the levels of two input signals, arrows indicating a direction entering the left sides of the circles represent input signals, and arrows indicating a direction exiting from the right sides of the circles represent output signals. Of two arrows representing output signals from one comparator, the upper one represents an output signal with a higher level and the lower one represents an output signal with a lower level.

The search circuit 13 compares the pixel values of two pixels of each of four groups at the first stage of a search tree, moves a larger one to the upper level of the search tree and moves a smaller one to the lower level of the search tree. The search circuit 13 repeats a similar process at the second and the third stage. At the third stage of the search tree, the search circuit 13 compares the pixel values of two uppermost pixels so as to obtain the maximum value Pmax1 of the pixel values of the adjacent pixels, and compares the pixel values of two lowermost pixels so as to obtain the minimum value Pmin1 of the pixel values of the adjacent pixels. Further, at the fourth stage of the search tree, the search circuit 13 compares the pixel values of two pixels with the highest levels next to the maximum value Pmax1 so as to obtain the second largest value Pmax2 of the pixel values of the adjacent pixels, and compares the pixel values of two pixels with the lowest levels next to the minimum value Pmin1 so as to obtain the second smallest value Pmin2 of the pixel values of the adjacent pixels. In this way, the search circuit 13 searches the maximum value Pmax1, the second largest value Pmax2, the second smallest value Pmin2, and the minimum value Pmin1 of the adjacent pixels.

The defect determining circuit 14 functions as a defect determining unit for determining whether the target pixel is a defect or not, on the basis of the pixel value of the target pixel and the pixel values of the plurality of adjacent pixels. The selector 15 functions as a selection unit for selecting a pixel value to be assigned to the target pixel according to the result of defect determination of the defect determining circuit 14 and outputting the pixel value. The selector 15 selects either the pixel value (signal 21) of the target pixel input from the horizontal delay line 12 or a pixel value (signal 23) of a pixel to be a replacement source input from the defect determining circuit 14, as the pixel value to be assigned to the target pixel. The replacement source pixel is a pixel serving as a source of a pixel value to replace the pixel value of the target pixel, among the plurality of adjacent pixels.

Figure 6:
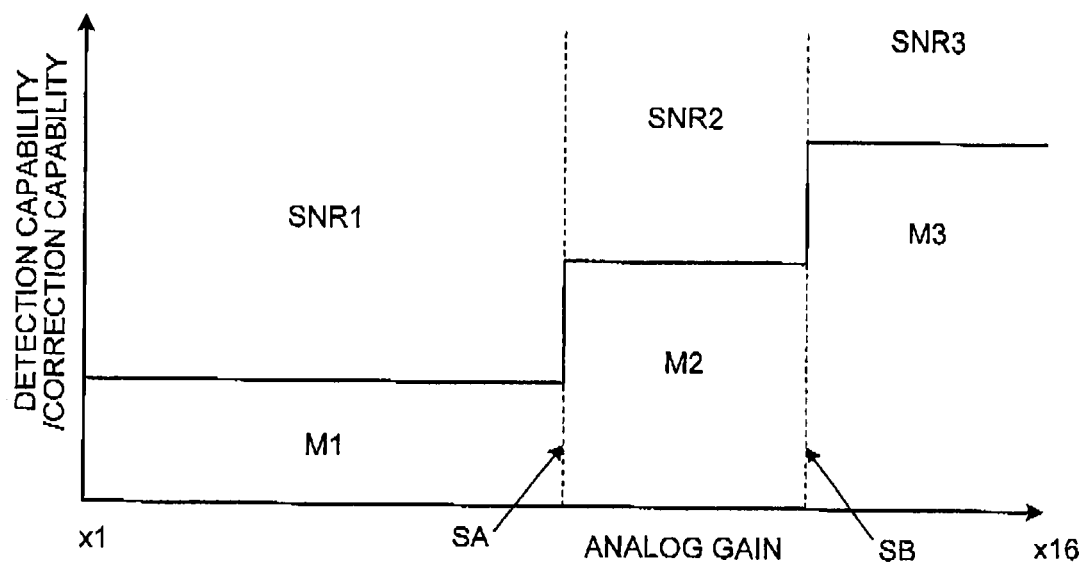
FIG. 6 is a conceptual view illustrating SNR estimation in an SNR estimator.

FIG. 6 is a conceptual view illustrating SNR estimation in the SNR estimator. In FIG. 6, a horizontal axis represents an analog gain, and a vertical axis represents the detection capability and correction capability of the defect correction circuit 5. The detection capability of the defect correction circuit 5 indicates the degree of strictness of defect detection which the defect determining circuit 14 uses as a reference of the defect detection. The correction capability of the defect correction circuit 5 indicates the degree of positiveness of defect correction which the selector 15 uses as a reference of pixel value selection.

The level of the SNR is estimated to be opposite to the level of the analog gain. The level of the SNR is divided into three stages of a high region SNR1, an intermediate region SNR2, and a low region SNR3. The SNR estimator 6 senses what region the estimated SNR corresponds to. In the SNR estimator 6, a boundary between the high region SNR1 and the intermediate region SNR2 is preset as a region definition SA, and a boundary between the intermediate region SNR2 and the low region SNR3 is preset as a region definition SB.

The SNR estimator 6 outputs a mode switch signal 25 (see FIG. 3) for switching the detection capability and the correction capability according to a region including the estimated SNR. For example, in the case where the estimated SNR is included in the high region SNR1, the SNR estimator 6 outputs a mode switch signal 25 for setting a one-pixel-detection one-pixel-correction mode M1. In the case where the estimated SNR is included in the intermediate region SNR2, the SNR estimator 6 outputs a mode switch signal 25 for setting a two-pixel-detection one-pixel-correction mode M2. In the case where the estimated SNR is included in the low region SNR3, the SNR estimator 6 outputs a mode switch signal 25 for setting a two-pixel-detection two-pixel-correction mode M3.

The SNR estimator 6 performs switching among three modes by, for example, the following 2-bit mode switch signals 25.

00h: one-pixel-detection one-pixel-correction mode M1
01h: two-pixel-detection one-pixel-correction mode M2
10h: two-pixel-detection two-pixel-correction mode M3

The defect determining circuit 14 performs defect determination according to the level of the SNR estimated by the SNR estimator 6. In the case where the defect determining circuit 14 determines that the target pixel is a defect, the selector 15 outputs a pixel value according to the level of the SNR. According to this, the defect correction circuit 5 appropriately distributes the detection capability and the correction capability according to the level of the SNR. The detection capability and correction capability of the defect correction circuit 5 are set to be improved as the analog gain increases and the SNR decreases.

Next, a process of defect determination and defect correction of the defect correction circuit 5 in each mode will be described. As examples of a defect which is a subject of defect detection, there are a so-called black defect where the luminance of a pixel is lower than that of a normal pixel and a so-called white defect where the luminance of a pixel is higher than that of a normal pixel. Here, a case of determining whether the target pixel is a white defect or not will be described as an example.

Figure 7:
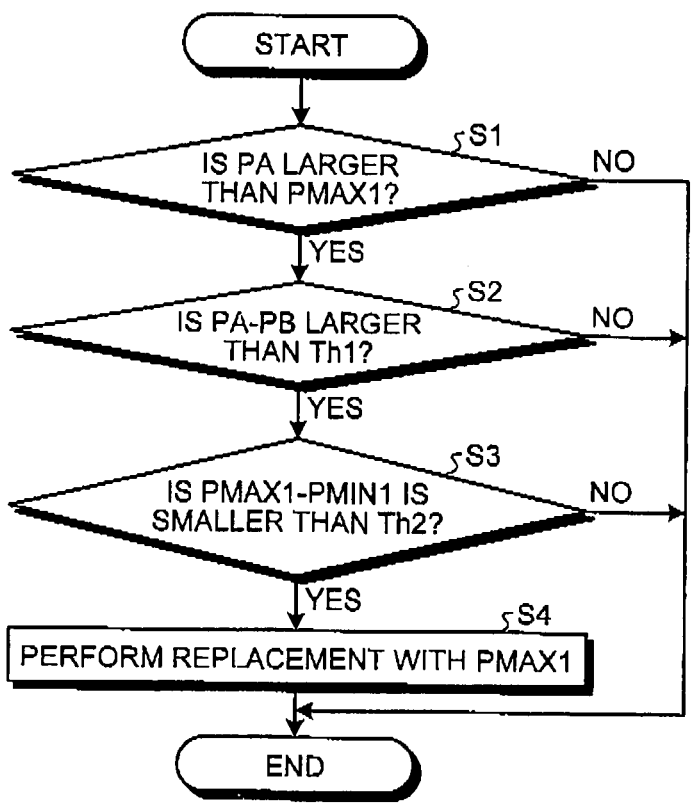
FIG. 7 is a flow chart illustrating a process of defect determination and defect correction in a one-pixel-detection one-pixel-correction mode.

FIG. 7 is a flow chart illustrating a process of defect determination and defect correction in the one-pixel-detection one-pixel-correction mode. In the one-pixel-detection one-pixel-correction mode M1, the defect correction circuit 5 uses information on all of 8 adjacent pixels for defect detection and defect correction on the assumption that a defect is not in the 8 adjacent pixels.

The defect determining circuit 14 compares the pixel value Pa of the target pixel with the maximum value Pmax1 in step S1. The defect determining circuit 14 determines whether the pixel value Pa is the maximum of the pixel values of the target pixel and the 8 adjacent pixels. In the case where the pixel value Pa is not larger than the maximum value Pmax1 (No in step S1), the defect determining circuit 14 determines that the target pixel is not a defect, and finishes the process.

In the case where the pixel value Pa is larger than the maximum value Pmax1 (Yes in step S1), the defect determining circuit 14 compares a difference Pa−Pb between the pixel value Pa and the average value Pb with a preset first threshold value Th1 in step S2. Here, the average value Pb is the average value of the pixel values of the 8 adjacent pixels.

In the case where the difference Pa−Pb is not larger than the first threshold value Th1 (No in step S2), the defect determining circuit 14 determines that the target pixel is not a defect and finishes the process. In the case where the difference Pa−Pb is larger than the first threshold value Th1 (yes in step 52), the defect determining circuit 14 compares a difference Pmax1−Pmin1 between the maximum value Pmax1 and the minimum value Pmin1 with a preset second threshold value Th2 in step S3.

The defect determining circuit 14 regards the difference Pmax1−Pmin1 as an edge component. The defect determining circuit 14 determines whether the target pixel determined to have a high possibility of being a defect in step S1 and step S2 is in an edge portion in step S3. In the case where the difference Pmax1−Pmin1 is not smaller than the second threshold value Th2 (No in step S3), the defect determining circuit 14 determines that the target pixel is in an edge portion and thus is not a subject of defect correction, and finishes the process. In the case where the difference Pmax1−Pmin1 is smaller than the second threshold value Th2 (Yes in step S3), the defect determining circuit 14 determines that the target pixel is not included in an edge portion and thus is a subject of defect correction.

The defect determining circuit 14 changes a pixel to be a source of a pixel value to replace a pixel value of the target pixel to another one among the plurality of adjacent pixels, according to the mode switch signal 25 from the SNR estimator 6. The defect determining circuit 14 selects the maximum value Pmax1 as the pixel value of the pixel to be the source for replacement according to the mode switch signal 25 for setting the one-pixel-detection one-pixel-correction mode M1, and inputs the maximum value Pmax1 to the selector 15.

In the case of determining that the target pixel is a white defect and is a subject of defect correction, the defect determining circuit 14 outputs a correction signal 24 (see FIG. 3) to instruct replacement of the pixel value Pa of the target pixel with the maximum value Pmax1. The selector 15 selects the maximum value Pmax1 according to the correction signal 24 from the defect determining circuit 14 and outputs the maximum value Pmax1. In this way, the defect correction circuit 5 performs defect correction by replacing the pixel value of the target pixel with the maximum value Pmax1, and finishes the process.

In the one-pixel-detection one-pixel-correction mode M1, since it is possible to use a large amount of information for defect correction by assuming that a defect is not in the 8 adjacent pixels, good defect detection is possible. Further, since it is possible to use the maximum value Pmax1 as the pixel value of the pixel to be the source for replacement, it is possible to relatively reduce occurrence of a false color by erroneous correction, and resolution deterioration. However, in the case where a two-pixel defect occurs in which not only the target pixel but also any one of the adjacent pixels are defects, those advantages have a tradeoff relationship with persistence of the two-pixel defect. This mode is preferably selected in the case where the SNR is good and a two-pixel defect hardly occurs. In the case where a two-pixel defect rarely occurs, it is preferable to select the two-pixel-detection one-pixel-correction mode M2 to be described below.

Even in the case of determining whether the target pixel is a black defect or not, the defect determining circuit 14 performs a process similar to the case of white defect determination. In the case of black defect determination, the defect determining circuit 14 compares the pixel value Pa with the minimum value Pmin1 in step S1. In the case where the pixel value Pa is smaller than the minimum value Pmin1, the defect determining circuit 14 compares a difference Pb−Pa with the first threshold value Th1 in step S2. In the case of determining that the target pixel is a black defect, the defect determining circuit 14 replaces the pixel value of the target pixel with the minimum value Pmin1.

Figure 8:
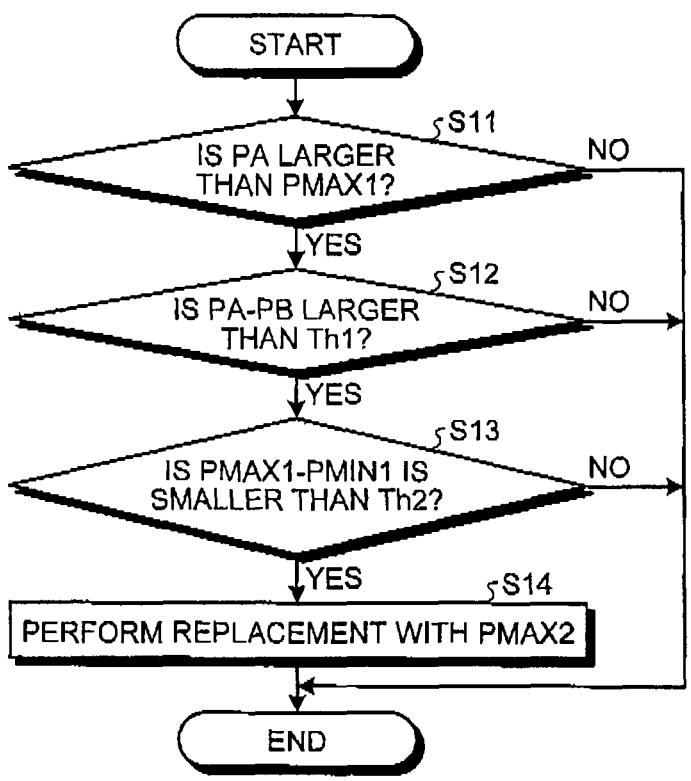
FIG. 8 is a flow chart illustrating a process of defect determination and defect correction in a two-pixel-detection one-pixel-correction mode.

FIG. 8 is a flow chart illustrating a process of defect determination and defect correction in the two-pixel-detection one-pixel-correction mode. In the two-pixel-detection one-pixel-correction mode M2, the defect correction circuit 5 is able to correct one pixel during occurrence of two pixel defects. The defect correction circuit 5 uses information on all of the 8 adjacent pixels for defect detection.

The defect determining circuit 14 compares the pixel value Pa with the maximum value Pmax1 in step S11. The defect determining circuit 14 determines whether the pixel value Pa is the maximum of the pixel values of the target pixel and the 8 adjacent pixels. In the case where the pixel value Pa is not larger than the maximum value Pmax1 (No in step S11), the defect determining circuit 14 determines that the target pixel is not a defect, and finishes the process.

In the case where the pixel value Pa is larger than the maximum value Pmax1 (Yes in step S11), the defect determining circuit 14 compares a difference Pa−Pb between the pixel value Pa and the average value Pb with the first threshold value Th1 in step S12. Here, the average value Pb is the average value of the pixel values of the 8 adjacent pixels.

In the case where the difference Pa−Pb is not larger than the first threshold value Th1 (No in step S12), the defect determining circuit 14 determines that the target pixel is not a defect, and finishes the process. In the case where the difference Pa−Pb is larger than the first threshold value Th1 (Yes in step S12), the defect determining circuit 14 compares the difference Pmax1−Pmin1 with the second threshold value Th2 in step S13.

In the case where the difference Pmax1−Pmin1 is not smaller than the second threshold value Th2 (No in step S13), the defect determining circuit 14 determines that the target pixel is in an edge portion and is not a subject of defect correction, and finishes the process. In the case where the difference Pmax1−Pmin1 is smaller than the second threshold value Th2 (Yes in step S13), the defect determining circuit 14 determines that the target pixel is not included in an edge portion and is a subject of defect correction.

The defect determining circuit 14 selects the second largest value Pmax2 as the pixel value of the pixel to be the source for replacement according to the mode switch signal 25 for setting the two-pixel-detection one-pixel-correction mode M2, and inputs the second largest value Pmax2 to the selector 15. In the case of determining that the target pixel is a white defect, the defect determining circuit 14 outputs the correction signal 24 to instruct replacement of the pixel value Pa of the target pixel with the second largest value Pmax2. The selector 15 selects the second largest value Pmax2 according to the correction signal 24 from the defect determining circuit 14, and outputs the second largest value Pmax2. In this way, the defect correction circuit 5 performs defect correction by replacing the pixel value of the target pixel with the second largest value Pmax2 in step S14, and finishes the process.

In the case of the two pixel defects, although the pixel value of the target pixel is replaced with the maximum value Pmax1, since the pixel value replacement is performed between adjacent defects, the defect remains. It is possible to correct one pixel of the two pixel defects by using the second largest value Pmax2 as the pixel value of the pixel to be the source for replacement. In this mode, basically, it is assumed that the frequency of occurrence of two pixel defects is low, and information on all of the 8 adjacent pixels is used for defect detection, Since this mode performs defect detection in the case of the two pixel defects on the basis of information including the defects, the positiveness in coping with the two pixel defects may be small. Since information on the defects is included in the calculation for defect determination in step S12 and step S13, the defect is determined only in the case where the possibility of the two pixel defects is so high that even the case including the defect of the adjacent pixel exceeds the threshold value. In the case where two pixel defects are found here and there, in order to cope with the two pixel defects, it is preferable to select the positive two-pixel-detection two-pixel-correction mode M3.

Even in the case of determining whether the target pixel is a black defect or not, the defect determining circuit 14 performs a process similar to the case of white defect determination except that the level of luminance is opposite to the case of the white defect determination. In the case of determining that the target pixel is a black defect, the defect determining circuit 14 replaces the pixel value of the target pixel with the second smallest value Pmin2.

Figure 9:
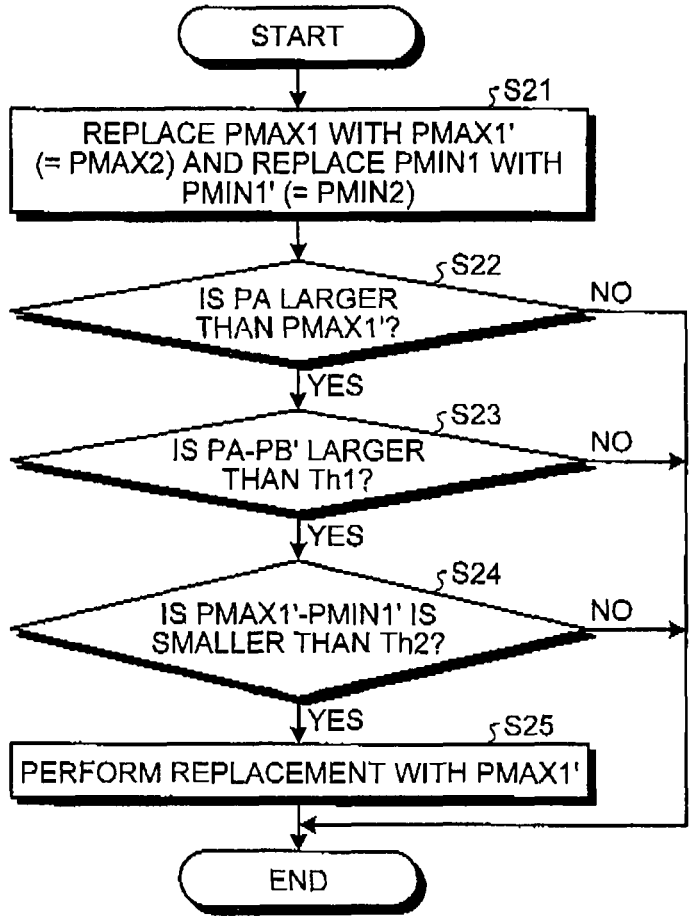
FIG. 9 is a flow chart illustrating a process of defect determination and defect correction in a two-pixel-detection two-pixel-correction mode.

FIG. 9 is a flow chart illustrating a process of defect determination and defect correction in the two-pixel-detection two-pixel-correction mode. In the two-pixel-detection two-pixel-correction mode M3, the defect correction circuit 5 excludes a pixel value of a pixel having a possibility of being a defect from information to be used for defect detection and defect correction on the assumption that one defect is in the 8 adjacent pixels.

The defect determining circuit 14 performs pixel value replacement on the pixel having the possibility of being a defect. The defect determining circuit 14 replaces the maximum value Pmax1 with Pmax1' (=Pmax2) and replaces the minimum value Pmin1 with Pmin1' (=Pmin2) in step S21.

The defect determining circuit 14 compares the pixel value Pa with the Pmax1' in step S22. The defect determining circuit 14 determines where the pixel value Pa is the maximum of the pixel values of the target pixel and 6 pixels except for the pixel with the maximum value Pmax1 and the pixel with the minimum value Pmin1 from the adjacent pixels. In the case where the pixel value Pa is not larger than the Pmax1' (No in step S22), the defect determining circuit 14 determines that the target pixel is not a defect, and finishes the process.

In the case where the pixel value Pa is larger than the Pmax1' (Yes in step S22), the defect determining circuit 14 compares a difference Pa−Pb' between the pixel value Pa and an average value Pb' with the first threshold value Th1 in step S23. Here, the average value Pb' is the average value of the pixel values of the 8 adjacent pixels after replacement in step S21.

In the case where the difference Pa−Pb' is not larger than the first threshold value Th1 (No in step S23), the defect determining circuit 14 determines that the target pixel is not a defect, and finishes the process. In the case where the difference Pa−Pb' is larger than the first threshold value Th1 (Yes in step S23), the defect determining circuit 14 compares a difference Pmax1'−Pmin1' between the Pmax1' and the Pmin1' with the second threshold value Th2 in step S24.

In the case where the difference Pmax1'−Pmin1' is not smaller than the second threshold value Th2 (No in step S24), the defect determining circuit 14 determines that the target pixel is in an edge portion and is not a subject of defect correction, and finishes the process. In the case where the difference Pmax1'−Pmin1' is smaller than the second threshold value Th2 (Yes in step S24), the defect determining circuit 14 determines that the target pixel is not included in an edge portion and is a subject of defect correction.

The defect determining circuit 14 selects the Pmax1' as the pixel value of the pixel to be the source for replacement according to the mode switch signal 25 for setting the two-pixel-detection two-pixel-correction mode M3, and inputs the Pmax1' to the selector 15. In the case of determining that the target pixel is a white defect, the defect determining circuit 14 outputs the correction signal 24 to instruct replacement of the pixel value Pa of the target pixel with the Pmax1'. The selector 15 selects the Pmax1' according to the correction signal 24 from the defect determining circuit 14, and outputs the Pmax1'. In this way the defect correction circuit 5 performs defect correction by replacing the pixel value of the target pixel with the Pmax1', that is, the second largest value Pmax2 in step S25, and finishes the process.

By performing the pixel value replacement in step S21, the defect determining circuit 14 can perform defect determination and defect correction by a process similar to the case of the one-pixel-detection one-pixel-correction mode M1. Therefore, the defect determining circuit 14 can be simply configured. Further, in the two-pixel-detection two-pixel-correction mode M3, the defect determining circuit 14 may perform the process by using information on 6 adjacent pixels except for the pixel with the maximum value Pmax1 and the pixel with the minimum value Pmin1.

In the two-pixel-detection two-pixel-correction mode M3, it is possible to positively cope with the two-pixel defect by performing defect detection on the basis of information excluding the defect. However, since information used for defect correction is reduced by information of excluded two adjacent pixels, the accuracy of the detection is reduced. This mode uses the Pmax1' (Pmax2) as the pixel value of the pixel to be the source for replacement and thus allows occurrence of a false color by erroneous correction, and resolution deterioration to some extent. This mode is preferably selected in a scene with a low SNR which needs noise reduction more than resolution maintenance.

Even in the case of determining whether the target pixel is a black defect, the defect determining circuit 14 performs a process similar to that of the case of white defect determination except that the level of luminance is opposite to the case of the white defect determination. In the case of the black defect determination, the defect determining circuit 14 compares the pixel value Pa with the Pmin1' in step S22. In the case where the pixel value Pa is smaller than the Pmin1', the defect determining circuit 14 compares a difference Pb'–Pa with the first threshold value Th1 in step S23. In the case of determining that the target pixel is a black defect, the defect correction circuit 5 replaces the pixel value of the target pixel with the Pmin1', that is, the second smallest value Pmin2.

For example, in the case where a gradation level is low, in other words, in the case where the SNR is low, if defect correction is performed in each mode, all of two pixels of two pixel defects remain in the one-pixel-detection one-pixel-correction mode M1, one pixel of the two pixel defects is corrected in the two-pixel-detection one-pixel-correction mode M2, and all of the two pixels are corrected in the two-pixel-detection two-pixel-correction mode M3. In a scene with a low SNR, appropriate defect correction can be performed by improving the detection capability and the correction capability.

Meanwhile, in the case where a gradation level is high, in other words, in the case where the SNR is high, coloring by erroneous correction at a highlight portion is noticeable in the order of the one-pixel-detection one-pixel-correction mode M1, the two-pixel-detection one-pixel-correction mode M2, and the two-pixel-detection two-pixel-correction mode M3. In a scene with a high SNR, if the detection capability and the correction capability are reduced, appropriate defect correction can be performed. The expansion of the detection capability and the correction capability expands the influence of erroneous correction.

As described above, the defect determining circuit 14 switches the aim of the defect determination according to the level of the SNR. The selector 15 switches the reference of selection of a pixel value to be assigned to the target pixel. The defect correction circuit 5 can perform defect correction according to a scene by appropriately distributing the detection capability and the correction capability according to the estimated SNR.

The image processing apparatus 4 can obtain a high-quality image by appropriate defect correction of the defect correction circuit 5. The region division of the SNR is not limited to the case of division into the high region SNR1, the intermediate region SNR2, and the low region SNR3. The SNR may be divided into at least a plurality of regions, for example, two regions.

The SNR estimator 6 is not limited to the case of an SNR estimator which estimates the SNR according the analog gain of the image signal, but may be an SNR estimator which estimates the SNR by any method. The SNR estimator 6 may estimate the SNR on the basis of, for example, a signal level in an optical block (OB) region of the sensor unit 2.

The OB region includes pixel cells which have light-shielded photoelectric conversion elements and are arranged in parallel, and outputs a black level signal indicating the lowest gradation level. Noise and so on caused by a circuit are equally included in an available pixel signal and the black level signal. The SNR estimator 6 may estimate the SNR on the basis of the noise component calculated from the signal level in the OB region. In addition, the SNR estimator 6 may estimate the SNR on the basis of, for example, exposure time of the camera module.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a defect determining unit determining whether a target pixel is a defect or not, on the basis of a pixel value of the target pixel and pixel values of a plurality of adjacent pixels which are pixels for the same color as that of the target pixel and are located around the target pixel;
    a selection unit selecting a pixel value to be assigned to the target pixel according to the determination result from the defect determining unit; and
    a signal-to-noise ratio (SNR) estimating unit estimating an SNR of an image signal,
    wherein the defect determining unit performs defect determination according to the level of the SNR estimated by the SNR estimating unit,
    wherein when the defect determining unit determines that the target pixel is a defect, the selection unit outputs the pixel value according to the level of the SNR,
    wherein region setting is performed such that the level of the SNR is divided into a plurality of regions,
    wherein the SNR estimating unit outputs a mode switch signal representing a region including the estimated SNR, and
    wherein, according to the mode switch signal representing that the SNR is included in a lowest SNR region of the plurality of regions, the defect determining unit replaces a pixel value of a pixel with the maximum pixel value and a pixel value of a pixel with the minimum pixel value, with a pixel value of another pixel of the adjacent pixels.

2. The image processing apparatus according to claim 1,
wherein, according to the mode switch signal representing that the SNR is included in a highest SNR region of the plurality of regions, the defect determining unit selects a pixel with the maximum pixel value or a pixel with the minimum pixel value from the adjacent pixels, as a pixel to be a source of a pixel value to replace a pixel value of the target pixel.

3. The image processing apparatus according to claim 1,
wherein the defect determining unit changes a pixel to be a source of a pixel value to replace a pixel value of the target pixel to another one among the adjacent pixels, according to the level of the SNR estimated by the SNR estimating unit.

4. The image processing apparatus according to claim 1,
wherein the SNR estimating unit estimates the SNR according to an analog gain of the image signal.

5. A camera module comprising:
a lens unit receiving in light from an object;
an image sensor generating an image signal according to the light received by the lens unit; and
an image processing apparatus performing image processing on the image signal from the image sensor,
wherein the image processing apparatus includes:
    a defect determining unit determining whether a target pixel is a defect or not, on the basis of a pixel value of the target pixel and pixel values of a plurality of adjacent pixels which are pixels for the same color as that of the target pixel and are located around the target pixel;
    a selection unit selecting a pixel value to be assigned to the target pixel according to a determination result of the defect determining unit; and
    a signal-to-noise ratio (SNR) estimating unit estimating an SNR of the image signal,
wherein the defect determining unit performs defect determination according to the level of the SNR estimated by the SNR estimating unit,
wherein, in the case where the defect determining unit determines that the target pixel is a defect, the selection unit outputs the pixel value according to the level of the SNR,
wherein region setting is performed such that the level of the SNR is divided into a plurality of regions,
wherein the SNR estimating unit outputs a mode switch signal representing a region including the estimated SNR, and
wherein, according to the mode switch signal representing that the SNR is included in a lowest SNR region of the plurality of regions, the defect determining unit replaces a pixel value of a pixel with the maximum pixel value and a pixel value of a pixel with the minimum pixel value, with a pixel value of another pixel of the adjacent pixels.

6. The camera module according to claim 5,
wherein, according to the mode switch signal representing that the SNR is included in a highest SNR region of the plurality of regions, the defect determining unit selects a pixel with the maximum pixel value or a pixel with the minimum pixel value from the adjacent pixels, as a pixel to be a source of a pixel value to replace a pixel value of the target pixel.

7. The camera module according to claim 5,
wherein the defect determining unit changes a pixel to be a source of a pixel value to replace a pixel value of the target pixel to another one among the adjacent pixels, according to the level of the SNR estimated by the SNR estimating unit.

8. The camera module according to claim 5,
wherein the SNR estimating unit estimates the SNR according to an analog gain of the image signal.

9. An image processing method comprising:
performing defect determination to determine whether a target pixel is a defect or not, on the basis of a pixel value of the target pixel and pixel values of a plurality of adjacent pixels which are pixels for the same color as that of the target pixel and are located around the target pixel;
selecting a pixel value to be assigned to the target pixel according to a result of the defect determination; and
according to a level of a signal-to-noise ratio (SNR) estimated with respect to an image signal, making it possible to switch an aim of the defect determination and to switch a reference of the selection of the pixel value to be assigned to the target pixel,
wherein region setting is performed such that the level of the SNR is divided into a plurality of regions,
wherein a mode switch signal representing a region including the estimated SNR is generated, and
wherein, according to the mode switch signal representing that the SNR is included in a lowest SNR region of the plurality of regions, pixel values of a pixel with the maximum pixel value and a pixel with the minimum pixel value of the adjacent pixels are replaced with a pixel value of another pixel of the adjacent pixels.

10. The image processing method according to claim 9,
wherein, according to the mode switch signal representing that the SNR is included in a highest SNR region of the plurality of regions, a pixel with the maximum pixel value or a pixel with the minimum pixel value is selected from the adjacent pixels, as a pixel to be a source for pixel value replacement with the target pixel.

11. The image processing method according to claim 9,
wherein a pixel to be a source for pixel value replacement with the target pixel is switched from among the adjacent pixels, according to the estimated level of the SNR.

12. The image processing method according to claim 9,
wherein the SNR is estimated according to an analog gain of the image signal.

* * * * *